United States Patent
Toklu et al.

(10) Patent No.: US 6,724,915 B1
(45) Date of Patent: Apr. 20, 2004

(54) METHOD FOR TRACKING A VIDEO OBJECT IN A TIME-ORDERED SEQUENCE OF IMAGE FRAMES

(75) Inventors: Candemir Toklu, Plainsboro, NJ (US); Shih-Ping Liou, Robbinsville, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/039,007

(22) Filed: Mar. 13, 1998

(51) Int. Cl.$^7$ ................................................. G06K 9/00
(52) U.S. Cl. ........................ 382/103; 382/168; 382/291
(58) Field of Search .................................. 382/162, 168, 382/172, 174, 181, 199, 203, 209, 218, 232, 236, 238, 242, 291, 300, 103, 107; 348/169, 218, 407.1, 411.1, 412.1–420.1, 699, 703

(56) References Cited

U.S. PATENT DOCUMENTS

| | | | |
|---|---|---|---|
| 5,280,530 A | | 1/1994 | Trew et al. ..................... 382/1 |
| 5,473,369 A | | 12/1995 | Abe ........................... 348/169 |
| 5,592,228 A | | 1/1997 | Dachiku et al. ............ 348/416 |
| 5,625,715 A | | 4/1997 | Trew et al. ................. 382/236 |
| 5,684,715 A | | 11/1997 | Palmer ................... 364/514 C |
| 5,732,155 A | * | 3/1998 | Saito ........................... 382/232 |
| 5,969,764 A | * | 10/1999 | Sun et al. ................... 348/404 |
| 5,969,772 A | * | 10/1999 | Saeki ........................... 348/699 |
| 5,974,183 A | * | 10/1999 | Wilkinson ................... 382/236 |

OTHER PUBLICATIONS

"Tracking a Dynamic Set of Feature Points", Yao et al., IEEE Transactions on Image Processing, vol. 4, No. 10, Oct. 1995, pp. 1382–1395.

"Tracking Deformable Objects in the Plane Using an Active Contour Model", Leymarie et al., IEEE Transactions on Pattern Analysis and Machine Intelligence, vol. 15, No. 6, 6/93, pp. 617–634.

"Motion Tracking of Deformable Objects by Active Contour Models Using Multiscale Dynamic Programming", Fujimura et al., Jrnl of Visual Comm. & Image Representation, vol. 4, No. 4, Dec. 1993, pp. 382–391.

"Snakes: Active Contour Models", Kass et al., International Journal of Computer Vision, (1988), pp. 321–331.

"Robust Tracking of Stochastic Deformable Models in Long Image Sequences", Kervrann et al., IEEE Int'l Conference on Image Processing, Nov. 13–16, 1994, Austin, TX, pp. 88–92.

"Tracking Complex Primitives in an Image Sequence", Bascle et al., 12th IAPR International Conference on Pattern Recognition, Jerusalem, Israel, Oct. 9–13, 1994, pp. 426–431.

(List continued on next page.)

*Primary Examiner*—Jayanti K. Patel
(74) *Attorney, Agent, or Firm*—Donald B. Paschburg; F. Chau & Associates, LLP

(57) ABSTRACT

A method for tracking a video object in a time-ordered sequence of image frames, comprises the steps of (a) identifying the object to be tracked in a first frame and determining its shape in the first frame; (b) selecting another frame, referred to as the last frame and identifying the shape of the object in the last frame; (c) selecting a number of intermediate frames between the first and last frames; (d) automatically identifying the shape of the object in the intermediate frames; and (e) interpolating between all of the frames in the sequence so as to determine the trajectory of the object in all of the frames.

4 Claims, 4 Drawing Sheets

OTHER PUBLICATIONS

"Region Tracking Through Image Sequences", Bascle et al., Fifth International Conference on Computer Vision, Jun. 20–23, 1995, Cambridge, MA, pp. 302–307.

"New Algorithms for Fixed and Elastic Geometric Transformation Models", Tang et al., IEEE Transactions on Image Processing, vol. 3, No. 4, Jul. 1994, pp. 355–366.

"Region–Based Tracking Using Affine Motion Models in Long Image Sequences", Meyer et al., CVGIP: Image Understanding, vol. 60, No. 2, Sep. 1994, pp. 119–140.

"Object Tracking Based on Temporal and Spatial Information", Moscheni et al., IEEE International Conf. Acoust., Speech, and Signal Processing (Atlanta, GA), May 1996, pp. 1–4.

"Video and Audio: Organization and Retrieval in the WWW", Chen et al., http://www.vosaic.com/corp/papers/www5.html.

"Video Hypermedia Authoring Using Automatic Object Tracking", Kanda et al., SPIE, vol. 3312, pp. 108–115.

"Color Indexing", Swain et al., International Journal of Computer Vision, 7:1, 1991, pp. 11–32.

"Object Tracking Through Adaptive Correlation", Montera et al., SPIE vol. 1959, Optical Pattern Recognition IV, 1993, pp. 314–321.

"Model–Based 2D&3D Dominant Motion Estimation for Mosaicing and Video Representation", Sawhney et al., Fifth Int'l Conference on Computer Vision, Jun. 20–30, 1995, Cambridge, MA, pp. 583–590.

\* cited by examiner

STEP 120

STEP 150

STEP 160

METHOD FOR TRACKING A VIDEO OBJECT IN A TIME-ORDERED SEQUENCE OF IMAGE FRAMES

FIELD OF THE INVENTION

The present invention is related to the field of digital video processing and analysis, and more specifically, to a method and apparatus for tracking a video object in an ordered sequence of two-dimensional images, including obtaining the trajectory of the video object in the sequence of images.

BACKGROUND OF THE INVENTION

Reference is made to a patent application entitled Apparatus and Method For Collaborative Dynamic Video Annotation being filed on even date herewith, and assigned to the same assignee as the present application, and whereof the disclosure is herein incorporated by reference to the extent it is not incompatible with the present application.

A situation can arise wherein two or more users wish to communicate in reference to a common object, for example, in reference to a video. An example of this could be where a soccer team coach wishes to consult with a colleague to seek advice. The soccer team coach might wish to show a taped video of a game and ask the colleague to explain, using the video, why one team failed to score in a given attack situation. In addition, the coach might wish to record this discussion and show it later to other coaches to get more opinions.

In another scenario, a student could be taking a training course being given at a remote location from where a course instructor is located. It may be that the student cannot understand a procedure being taught in the course. The student can then call the instructor over the Internet phone to find out how such a procedure should be performed. The instructor can first browse through the training video together with the student to find the clip where the difficulty can be identified. The student may then ask various questions of the instructor about that procedure. For example, the instructor may then decide to show the student another video, which offers more detailed information. The instructor may then annotate this video using collaborative video annotation tools to explain to the student how this procedure should be performed.

Existing methods for object tracking can be broadly classified as feature-point (or token) tracking, boundary (and thus shape) tracking and region tracking. Kalman filtering and template matching techniques are commonly applied for tracking feature points. A review of other 2-D and 3-D feature-point tracking methods is found in Y.-S. Yao and R. Chellappa, "Tracking a dynamic set of feature points," IEEE Trans. Image Processing, vol.4, pp.1382–1395, October 1995.

However, all these feature point tracking methods fail to track occluded points unless they move linearly. Boundary tracking has been studied using a locally deformable active contour model snakesy. See, for example, F. Leymarie and M. Levine, "Tracking deformable objects in the plane using an active contour model," IEEE Trans. Pattern Anal. Mach. Intel., vol.15, pp.617–634, June 1993;. K. Fujimura, N. Yokoya, and K. Yamamoto, "Motion tracking of deformable objects by active contour models using multiscale dynamic programming," J. of Visual Comm. and Image Representation, vol.4, pp.382–391, December 1993; M. Kass, A. Witkin, and D. Terzopoulos, "Snakes: active contour models," Int. Journal of Comp. Vision, vol. 1, no. 4, pp. 321–331, 1988. In addition, boundary tracking ahs been studied using a locally deformable template model. See, for example, C. Kervrann and F. Heitz, "Robust tracking of stochastic deformable models in long image sequences," in IEEE Int. Conf. Image Proc., (Austin, Tex.), November 1994.

These boundary tracking methods, however, lack the ability of tracking rapidly moving objects because they do not have a prediction mechanism to initialize the snake. In order to handle large motion, a region-based motion prediction has been employed to guide the snake into a subsequent frame. See, for example, B. Bascle and et al, "Tracking complex primitives in an image sequence," in Int. Conf. Pattern Recog., (Israel), pp. 426–431, October 1994; and B. Bascle and R. Deriche, "Region tracking through image sequences," in Int. Conf. Computer Vision, pp. 302–307, 1995.

Nevertheless, the prediction relies on a global, that is, not locally varying, motion assumption, and thus may not be satisfactory when there are local deformations within the boundary and the image background is very busy. Region tracking methods can be categorized into those that employ global deformation models and those that allow for local deformations. See for example, Y. Y. Tang and C. Y. Suen, "New algorithms for fixed and elastic geometric transformation models," IP, vol. 3, pp.355–366, July 1994.

A method for region tracking using a single affine motion within each object has been proposed that assigns a second-order temporal trajectory to each affine model parameter. See, for example, F. G. Meyer and P. Bouthemy, "Region-based tracking using affine motion models in long image sequences," CVGIP: Image Understanding, vol. 60, pp.119–140, September 1994. Bascle et. al. propose to combine region and boundary tracking. See the aforementioned article by B. Bascle and R. Deriche, "Region tracking through image sequences," in Int. Conf. Computer Vision, pp. 302–307, 1995.

They use a region-based deformable model, which relies on texture matching for its optimization, that allows the tracking approach to handle relatively large displacements, cluttered images and occlusions. Moscheni et. al. suggest using spatio-temporal segmentation for every frame pair followed by the temporal linkage of an object, to track coherently moving regions of the images. See F. Moscheni, F. Dufaux, and M. Kunt, "Object tracking based on temporal and spatial information," in IEEE Int. Conf. Acoust., Speech, and Signal Proc., (Atlanta, Ga.), May 1996.

Additional background information is provided in the following:

U.S. Pat. No. 5,280,530, entitled METHOD AND APPARATUS FOR TRACKING A MOVING OBJECT and issued Jan. 18, 1994 the name of Trew et al. discloses a method of tracking a moving object in a scene, for example the face of a person in videophone applications. The method comprises forming an initial template of the face, extracting a mask outlining the face, dividing the template into a plurality (for example sixteen) sub-templates, searching the next frame to find a match with the template, searching the next frame to find a match with each of the sub-templates, determining the displacements of each of the sub-templates with respect to the template, using the displacements to determine affine transform coefficients and performing an affine transform to produce an updated template and updated mask.

U.S. Pat. No. 5,625,715, entitled : METHOD AND APPARATUS FOR ENCODING PICTURES INCLUDING A MOVING OBJECT, issued Apr. 29, 1997 in the name of Trew et al. discloses a method of encoding a sequence of images including a moving object. The method comprises forming an initial template, extracting a mask outlining the object, dividing the template into a plurality (for example sixteen) sub-templates, searching the next frame to find a match with the template, searching the next frame to find a match with each of the sub-templates, determining the displacements of each of the sub-templates with respect to the template, using the displacements to determine affine transform coefficients and performing an affine transform to produce an updated template and updated mask. Encoding is performed at a higher resolution for portions within the outline than for portions outside the outline.

U.S. Pat. No. 5,473,369 entitled OBJECT TRACKING APPARATUS issued Feb. 23, 1994 in the name of Abe discloses an object detecting and tracking apparatus which detects a tracking target object from a moving image photographed by a television camera and tracks the same, wherein the movement of the object is detected reliably and with high accuracy to automatically track the target object. When tracking is started after putting the target object in a region designating frame "WAKU" displayed on a screen in such a way as to be variable in size and position, a video signal input from a photographic optical system is Y/C-separated. After that, the target object is specified from a tracking region histogram, and movement vectors are obtained from a color-time-space image, color-time-space differential image, and/or luminance-time-space image thereof, thereby making it possible to more reliably detect even the movement of varied objects as compared with the conventional block matching.

U.S. Pat. No. 5,592,228 entitled VIDEO ENCODER USING GLOBAL MOTION ESTIMATION AND POLYGONAL PATCH MOTION ESTIMATION and issued Jan. 7, 1997 in the name of Dachiku et al. discloses a video coding apparatus for a high coding efficiency even at a low bit rate which includes a moving object analyzer which extracts a moving part from an input picture signal, analyzes its motion, and outputs a residual signal relative to a reconstruction image and motion parameters. The apparatus further includes a residual coding device for coding the residual signal, a reconstruction device for reconstructing a picture using the motion parameters, and a device that performs a variable length coding of the motion parameters and residual coded information.

Patent document EP 0 805 405 A2, "MOTION EVENT DETECTION FOR VIDEO INDEXING", Courtney et al., discusses a motion segmentation method for object tracking. Given the segmented images and the motion of each segment, the method links the segments in consecutive frames based on their position and estimated velocity to achieve object tracking.

U.S. Pat. No. 5,684,715 entitled INTERACTIVE VIDEO SYSTEM WITH DYNAMIC VIDEO OBJECT DESCRIPTORS issued Nov. 4, 1997 in the name of Palmer discloses an interactive video system by which an operator is able to select an object moving in a video sequence and by which the interactive video system is notified which object was selected so as to take appropriate action. Interactive video is achieved through generation and use of video object descriptors which are synchronized to objects in the video sequence. Video object descriptors are generated by a generating tool which decomposes frames of video sequences and tracks movement of objects in those frames so as to generate a frame sequential file of video object descriptors. The file of video object descriptors are then used by an event interpreter which detects a match between the position of a pointing device on a display containing the video sequence and the position of a video object descriptor. When a match is detected, an interactive video operation is performed, such as jumping to a new video sequence, altering flow of the interactive video program or the like.

All these region and boundary tracking methods address tracking the shape and location of the object, if the object boundary is provided only in one frame, the starting frame, or not provided in any frame. In the latter, motion segmentation methods are employed to find the objects in a scene.

Selection of the object boundary in more than one frame is addressed by Z. Chen, S.-M. Tan, D. Xie, A. Sane, Y. Li and R. H. Campbell in http://www.vosaic.com/corp/papers/www5.html, and in J. Kanda, K. Wakimoto, H. Abe, and S. Tanaka, "Video hypermedia authoring using automatic object tracking," in *Proceedings of SPIE on Storage and Retrieval for Image and Video Databases VI*, (San Jose, Calif.), pp. 108–115, Jan. 18–30 1998.

Both methods proposed to use linear interpolation for predicting the location of the object in between from those given for two frames. In addition, Kanda et al. suggested using the location information of the object given in any two frames to check the validity of a template based tracking results from one frame to another. However, both of the above methods do not utilize the shape, location, and color information of the object in both frames to help and improve the template-based tracking performance.

SUMMARY OF THE INVENTION

An object of the present invention is to satisfy the aforementioned needs. In accordance with an aspect of the present invention, a program for use on a computer provides a location and marker of a video object from a plurality of images.

In accordance with another aspect of the invention, a computer readable storage medium has a computer program stored thereon performing the steps of (a) identifying an object to be tracked in a frame, referred as the first frame, and determining its shape in this frame; (b) selecting another frame, referred to as the last frame, and identifying the shape of the same object in this frame; and (c) finding the location and marker, hence the trajectory and global motion, of the object in every frame in between the first and last frames.

In accordance with another aspect of the invention, step (c) comprises the steps of (i) finding the location, marker and shape of the object, in a subset of frames in between the first and last frames; and (2) finding the location, marker and shape of the object in every frame from those.

In accordance with another aspect of the invention, step (1) further comprises the steps of (A) predicting the marker location and location of the object in the frame being processed from those for the neighboring processed frames; (B) predicting the marker and location of the object in the frame being processed based on histogram back-projection; (C) fusing of the two predictions for the marker and location in the frame being processed to find the search space for template matching; (D) template matching for finding the marker and location of the object in the frame being processed; and (E) identifying the boundary of the object in the frame being processed.

It is an object of the present invention to provide an object tracking technique that finds the location and marker of the object being tracked in an image sequence, while permitting partial occlusions by other objects in the video or self-occlusions.

BRIEF DESCRIPTION OF DRAWINGS

The invention will be more fully understood from the following description of the preferred embodiments, in conjunction with the drawing, in which.

DETAILED DESCRIPTION OF THE PREFERRED EMBODIMENTS

In the following description, the present invention will be described by way of preferred exemplary embodiments, including a software program. Those skilled in the art will recognize that an equivalent hardware embodiment may be readily constructed to provide an equivalent apparatus and method.

The user is considered to be provided with a digital sequence of frames which are shot by a moving camera and then stored in digital format. The camera can zoom in and out and translate in space. In addition, the objects in the scene that is being shot can move forward or backward with respect to the camera. Such movements of the camera and the object cause the object size to become smaller and bigger.

Figure 1:
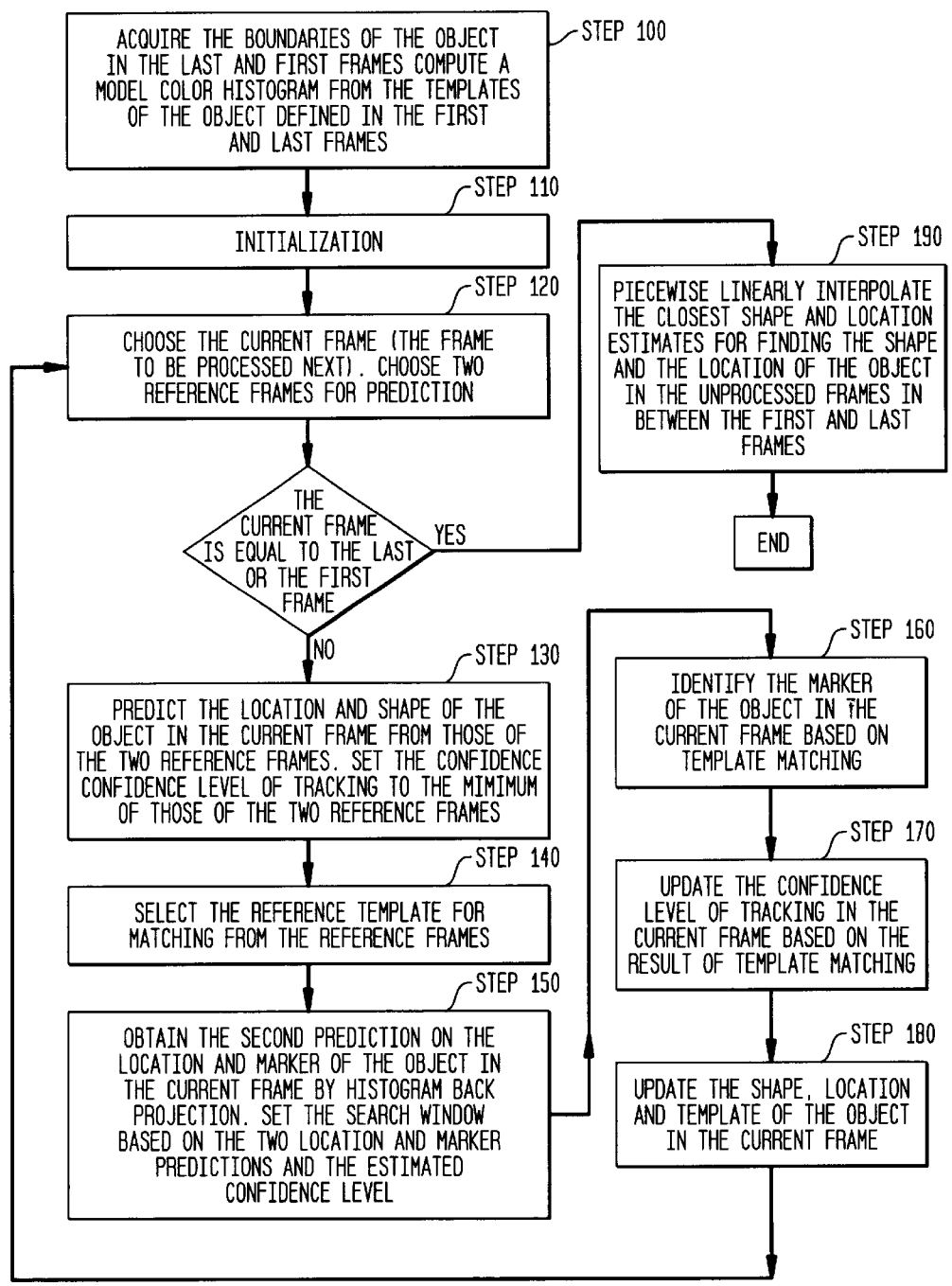
FIG. 1 is a flowchart for a method in accordance with the present invention.

FIG. 1 shows 10 steps of a method in accordance with the present invention. Briefly, the steps, which will be explained in further detail below, are as follows. Step 100 defines acquiring object boundaries in the first and last frames of the subject image sequence and computing a model color histogram. Step 110 defines an initialization step. Step 120 defines choosing the current frame and two reference frames. Proceeding from Step 120 to a decision box on the question of whether the current frame equal to the last or the first frame: if YES, the flow proceeds to Step 190 which defines piecewise linearly interpolating the closest shape and location estimates for finding the shape and the location of the object in the unprocessed frames in between the first and last frames. If NO, the flow proceeds to Step 130 which defines predicting the location and marker of the object and the confidence level of tracking in the current frame from those of the two reference frames. Step 140 defines selecting a reference template for matching from the reference frames. (Step 150) defines the step of obtaining a second prediction on the location and marker of the object and setting the search window size in the current frame. Step 160 defines identifying the location, marker and shape of the object in the current frame based on template matching. Step 170 defines the step of updating the confidence level of the tracking in the current frame Step 180) defines the step of updating the template of the object in the current frame. The flow then loops back to Step 120 until Step 190 is reached, to complete with piecewise linear interpolation.

Figure 2:
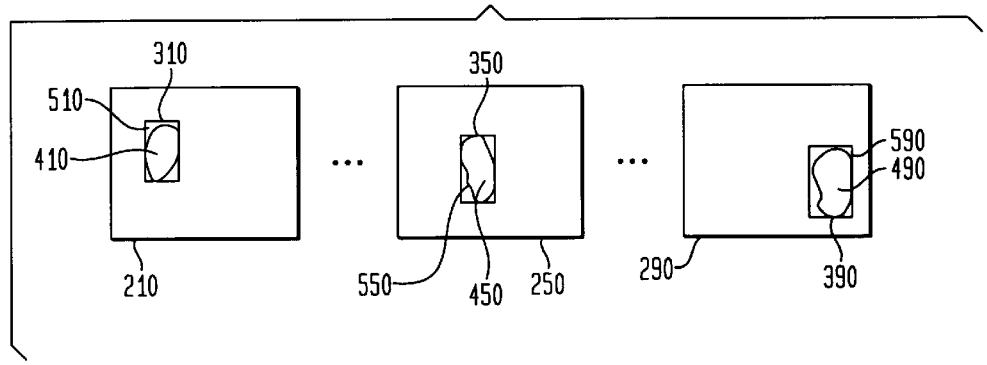
FIG. 2 is a diagram illustrating tracking results in several frames throughout a video clip, in accordance with the invention.

Referring to FIG. 2, a current frame 250 refers to the frame to be processed next. The reference frames are frames that are processed before and are used for predicting the location and marker of the object in the current frame. The confidence level of tracking at each frame is the reliability measure of the template matching result. The highest and lowest values for the confidence level are 100 and 0, referring to object preserving its shape and the object being lost, respectively. The marker of the object (310, 350, 390) refers a rectangular box covering the whole object. The location of the object (410, 450, 490) is the center of the object template at any frame. The shape of the object (510, 550, 590) refers to the object boundary. It is noted that the shape of an object is the more accurate representation for the object. It defines the exact location of the object in the image plane. The marker of an object is the rectangle outlying the object. The object could be anywhere within the marker. The tool in accordance with the invention provides the object markers to the user in every frame. In order to do so, the shape of the object in several frames is found.

Referring now to Step 100: Acquiring the object boundaries in the first and last frames of the image sequence and computing a model color histogram, is next explained in reference to FIG. 3. Consider the following: while playing the video clip, an operator pauses the video and identifies an object in the current frame. This frame is called the first frame 210. The operator manually marks the boundary of the object 510 in the first frame 210, for example, by using a computer mouse. Then, the operator starts playing the video clip from the first frame and pauses at another instant to select the second frame. This frame is called the last frame, 290. The operator marks the boundary of the same object 590 in the last frame, also manually. Once the boundaries of the object for the first and last frames are marked, then texture maps within these boundaries are selected as the object templates at the first and last frames, 610 and 690 in FIG. 2, respectively. The term texture maps as used herein means color intensities inside the object boundary. From these templates, a model histogram 701 is computed to be used for object location prediction in frames intermediate the first and last frames. A histogram is obtained by discretizing the image colors and counting the number of times each discrete color occurs in a specified region such as an image or multiple regions in an image. The operator also selects a preferred step size in time to allow skipping frames while tracking the object. If this step size in time is 1 frame, then the shape, marker and location of the object are computed by template matching in each frame between the first and last frames. The value of the preferable step size in time depends on the amount of action in the sequence in question. If the object in question is moving fast, then a small step size has to be selected, otherwise a larger step size can be selected assuming that the linear interpolation (Step 130) estimates the marker location accurately. Three different tracking strategies are allowed in this system, namely: forward, backward and bi-directional tracking. In forward/backward tracking the system starts from the first/last frame and finds the location, marker and shape of the object in the subsequent frames in fixed time steps. On the other hand, bi-directional tracking utilizes both forward and backward tracking with varying time steps.

Figure 3:
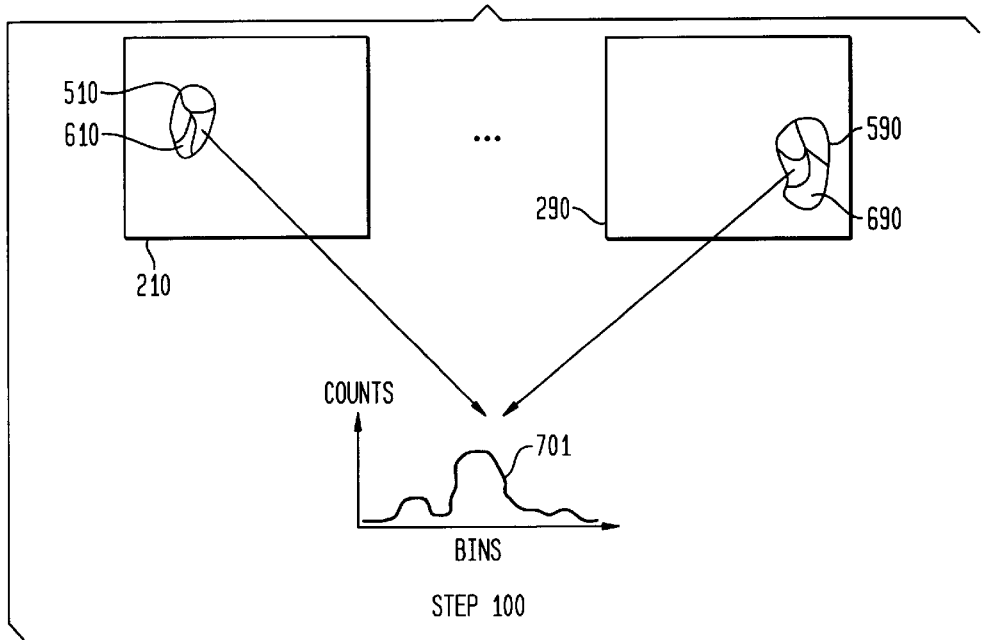
FIG. 3 is a diagram illustrating a method in accordance with the invention for identifying the first and last frames and the boundary of the object in these frames, and computing the model histogram.

Next, Step 110: Initialization, is considered. The confidence level of tracking at the first and last frames is set to 100. If the backward or forward tracking strategy has been selected, then the time step size 801 is set to the negative of the preferable step size or preferable step size specified in Step 100, respectively. Otherwise, the time step size 801 is set to one half of the time between the first and last frames. Referring to FIG. 3, the shape and the location of the object in the first and last frames are computed. In this figure, the rectangles 310 and 390, and points 410 and 490 corresponds to the markers and the locations of the object in the first and last frames, respectively. The marker of the object is defined to be the bounding rectangle around the object. The location of the object is selected as the center of gravity of the object. Given the object boundary in a frame the center of gravity of the object is computed as follows: Let $(x,y); x=1, \ldots W; y=1, \ldots, H$ denote a pixel in the image which has H number of lines, and W number of pixels in each line. Then, the x, and y values for every pixel that is inside the object boundary in the image are to obtain $sum_x$ and $sum_y$. These sums are then divided by the total number of pixels, N, inside the object boundary, to obtain the center of gravity $(c_x, c_y) = (sum_x/N, sum_y/N)$. The marker of the object is selected as the bounding rectangle around the object in every frame, and is defined by its center $(r_x, r_y)$, width w, and height h. In every frame throughout the sequence, the aspect ratio A=w/h for the marker remains constant.

The current frame, 250, that is, the frame to be processed next, is set to the first/last frame for forward/backward tracking.

Figure 4:
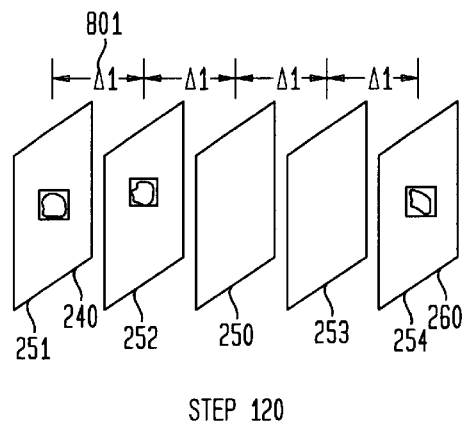
FIG. 4 is a diagram illustrating the reference frame selection; in accordance with the invention.

Next, Step 120 is considered: Choosing the current and two reference frames. Referring to FIG. 4, the current frame 250 index is incremented by the time step size 801 until an unprocessed frame is reached. If the forward or backward tracking is being done, the tracking system is terminated when the current frame 250 index reaches the last or first frame index, respectively. If bi-directional tracking is being done, then the time step size 801 is divided by two when the last frame is reached. If the time step size 801 is less than the preferable time step size then the tracking system, is terminated; otherwise the current frame 250 index is set to first frame index plus the time step size.

Referring to FIG. 4, for every current frame 250, two reference frames 240 and 260 are found in accordance with the following procedure. The current frame 250 index is incremented by the time step until a processed frame is found whose tracking confidence level is higher than a given threshold. This threshold is usually set to 50, this being midway between the best and worst confidence levels. Since frame 253 is not processed yet, as seen in FIG. 4, frame 254 is selected as a candidate reference frame. The same procedure is applied by decrementing the current frame index by the time step this time. This frame 252 is then picked as the first reference. The decrementing procedure is continued until another frame 251 is found whose confidence level for tracking is higher than the threshold and the first or last frame is reached. The confidence levels of frames 251 and 254 are compared, and the one with the largest value is picked as the second reference frame. The reference frame with the smallest index is called the start frame 240, and the other one is called the end frame 260.

Next, Step 130 is considered: Predicting the location and marker of the object and the confidence level of tracking in the current frame from those of the two reference frames.

Figure 5:
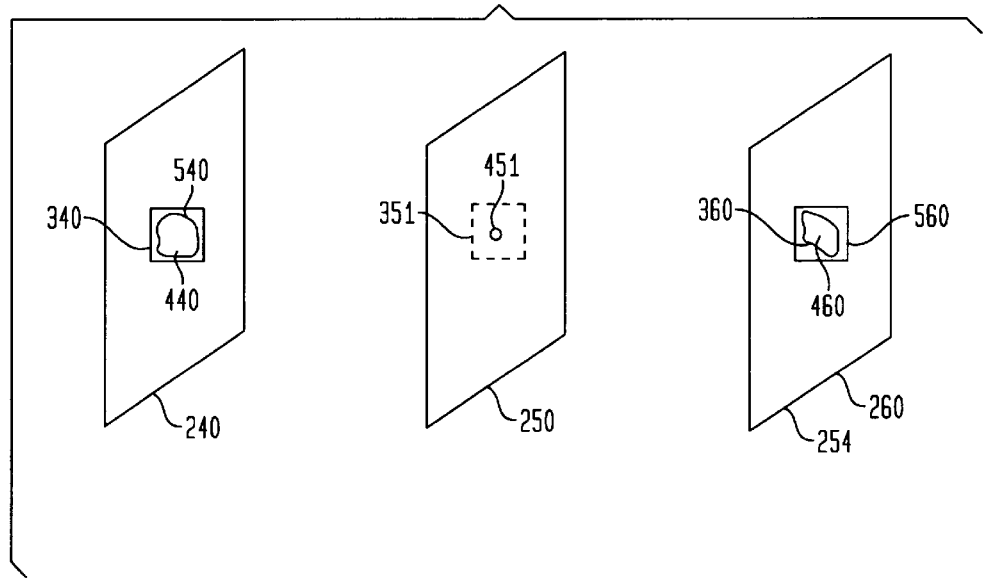
FIG. 5 is a diagram illustrating the marker and location prediction based on the trajectory of the object, in accordance with the invention.

Recalling the scenario in FIG. 4, let $t_1$, t, and $t_2$ denote the time index for the start frame 240, current frame 250, and end frame 260, respectively. Referring to FIG. 5, the first prediction for the location of the object $(\hat{x}, \hat{y})$ 451 in the current frame 250 is obtained by linear interpolation from the locations of the object $(x_1, y_1)$ 440 and $(x_2, y_2)$ 460 in the start and end frames, respectively, as follows:

$$\hat{x} = \frac{t_2 - t}{t_2 - t_1} x_1 + \frac{t - t_1}{t_2 - t_1} x_2$$

$$\hat{y} = \frac{t_2 - t}{t_2 - t_1} y_1 + \frac{t - t_1}{t_2 - t_1} y_2$$

Let $(r_{x_1}, r_{y_1})$, $w_1$ and $h_1$ 340, and $(r_{x_2}, r_{y_2}) w_2$ and $h_2$ 360, denote the respective centers, widths and heights for the marker of the object in the start frame 240 and end frame 260, respectively. Then, the predictions for the center, width and height of the marker of the object in the current frame $(\hat{r}_x, \hat{r}_y)$, $\hat{w}$ and $\hat{h}$ 351, respectively, are obtained by linear interpolation from those for the start frame 240 and end frame 260 as follows:

$$\hat{r}_x = \frac{t_2 - t}{t_2 - t_1} r_{x_1} + \frac{t - t_1}{t_2 - t_1} r_{x_2}$$

$$\hat{r}_y = \frac{t_2 - t}{t_2 - t_1} r_{y_1} + \frac{t - t_1}{t_2 - t_1} r_{y_2}$$

$$\hat{w} = \frac{t_2 - t}{t_2 - t_1} w_1 + \frac{t - t_1}{t_2 - t_1} w_2$$

$$\hat{h} = \frac{t_2 - t}{t_2 - t_1} h_1 + \frac{t - t_1}{t_2 - t_1} h_2$$

Next, Step 140 is considered: Selecting the reference template for matching. The closer frame of the two reference frames, the start frame 240 and end frame 260, in terms of their distances to the current frame, is found and the template for that frame is selected as the reference template 655. If the two reference frames are at the same distance to the current frame in time, then the template in the frame with the highest confidence level of tracking is selected.

Figure 6:
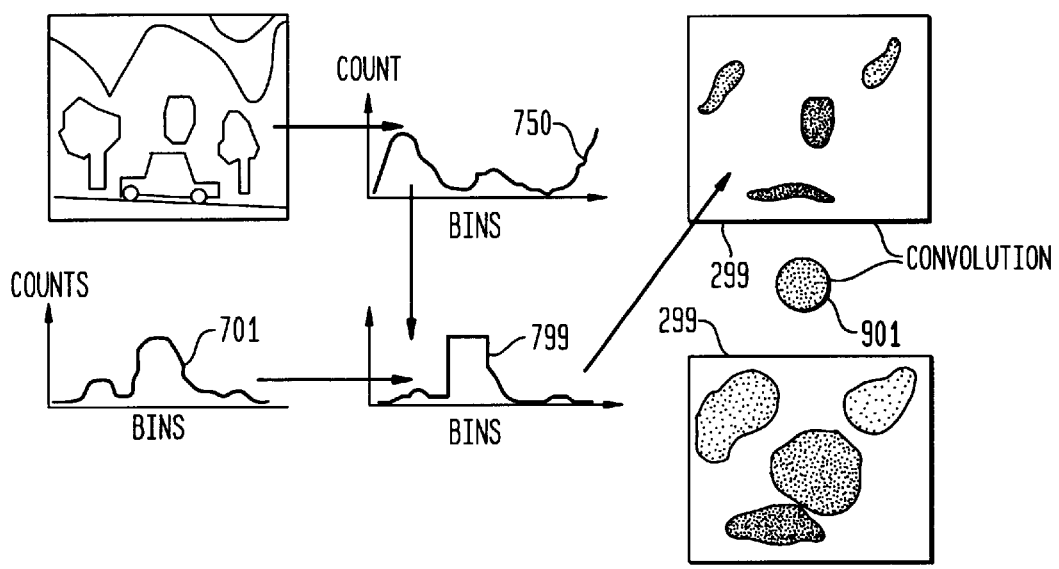
FIG. 6 is a diagram illustrating method in accordance with the invention for computing a histogram back-projected for the current frame.

Next, Step 150 is considered: Obtaining a second prediction on the location and marker of the object and setting the search window size in the current frame. Referring to FIG. 6, histogram 750 for the current frame is computed. Then the histogram back-projection method is applied to find out where in the image the colors are that belong to the object being looked for. See, for example, M. J. Swain, and D. H. Ballard, "Color indexing," *International Journal of Computer Vision*, vol.7, no.11, pp.11–32, 1991. Let $MH_{jj}=1, \ldots, C$ and $IH_{jj}=1, \ldots, C$ denote the model histogram 701 and image histogram 750 which is obtained from the colors in the current frame 250, where C is the total number of colors. Then, the ratio histogram $RH_{jj}=1, \ldots, C$ 799, is defined as $$RH_j = \min\left(\frac{MH_j}{IH_j}, 1\right)$$

Figure 7:
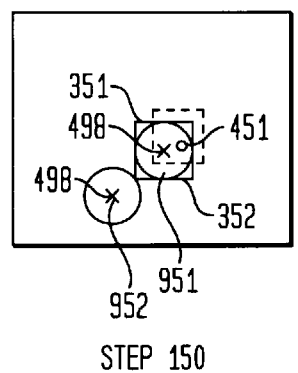
FIG. 7 is a diagram illustrating a method in accordance with the invention of selecting the search region.

This histogram, $RH_{jj}=1, \ldots, C$, is backprojected onto the current frame 250, that is, the image values are replaced by the values of $RH_{jj}=1, \ldots, C$, that they index. The backprojected image 299 is then convolved by a mask 901, which for compact objects of unknown orientation could be a circle with the same average area as the expected area subtended by the object in the reference frames. Referring to FIG. 7, then, the peaks in the convolved image are picked as the expected location of the object in the current frame. The masks $M_k$, $k=1, \ldots, K$, 951–952 are constructed where K denote the total number of peaks selected in the current frame, by shifting the center of the mask used for convolving the backprojected image to the image locations $(\bar{x}_k, \bar{y}_k), k=1, \ldots, K$ 498 of the peaks. These masks $M_k$, $k=1, \ldots, K$ are then intersected with the estimated rectangle for the marker in Step 130, whose image plane location is defined by its center, width and height $(\hat{r}_x,\hat{r}_y)$, $\hat{w}$ and $\hat{h}$ 351. The masks that have no intersection are eliminated from the list. Further eliminated are the ones that do not contain the predicted location $(\hat{x},\hat{y})$ 451 of the object, among the remaining masks $\hat{M}_k, k=1,\ldots,\hat{k}$ 951. After all redundant masks are eliminated the rectangle RR 352 whose center, width and height are denoted by $(R_x, R_y)$, W and H, respectively is constructed. The pixels with minimum and maximum horizontal coordinates in the current frame in the remaining masks $\hat{M}_k, k=1,\ldots,\hat{k}$ 951 are found. Let $y_{min}$ and $y_{max}$ denote the horizontal coordinates of these pixels. Similarly, the pixels with minimum and maximum vertical coordinates are found, and denote the vertical coordinates of these by $x_{min}$ and $x_{max}$, respectively. Then, letting $$(R_x, R_y) = \left(\frac{x_{\min} + x_{\max}}{2}, \frac{y_{\min} + y_{\max}}{2}\right)$$
$$W = \max(x_{\max} - x_{\min}, A \times (y_{\max} - y_{\min})),$$
$$H = \max\left(\frac{x_{\max} - x_{\min}}{A}, y_{\max} - y_{\min}\right)$$

where $A = \frac{w}{h}$ is the aspect ratio defined in Step 110

Figure 8:
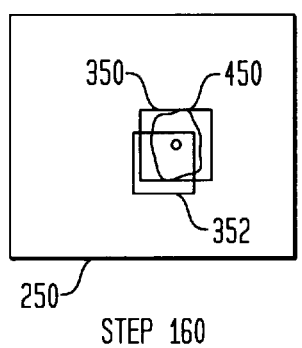
FIG. 8 is a diagram illustrating a method in accordance with the invention for determining the boundary of the object in the current frame.

The rectangle RR is then set as the search space for the template matching that is disclosed in Step 160. If the current frame is in between the start and end frames then the confidence level of tracking for the current frame is set to the average of those for the start and end frames. Otherwise, the confidence level of tracking is set to the value for the end frame. Next, Step 160 is considered: Identifying the marker of the object in the current frame based on template matching. Referring to FIG. 8, within the search space defined by the rectangle RR 352 in the current frame 250, then a search is performed for the best location 450 and marker 350 of the object either using methods for template matching by correlation or robust mean square minimization. See for example D. Montera, S. Rogers, D. W. Ruck, and M. Oxley, "Object tracking through adaptive correlation," *Proc. Of the Society of Photo-Optical and Instr. Eng.*, Optical Pattern Recognition IV, vol. 1959, pp. 314–321, 1993. H. S. Sawhney, S. Ayer, and M. Gorkani, "Model-based 2D&3D dominant motion estimation for mosaicing and video representation," *Int. Conf. Computer Vision*, 1995.

$$C = \frac{N\sum_{(i,j)} M(i,j)I(T(i,j)) - \sum_{(i,j)} M(i,j)\sum_{(i,j)} I(T(i,j))}{\sqrt{N\sum_{(i,j)} I(T(i,j))^2 - \left(\sum_{(i,j)} I(T(i,j))\right)^2} \sqrt{N\sum_{(i,j)} M(i,j)^2 - \left(\sum_{(i,j)} M(i,j)\right)^2}}$$

where M(I, j) denote the reference template, I(T(ij)) denote the intensity distribution of the current frame 250 under the spatial transformation T, and N denote the total number of pixels in the template. The spatial transformation T is defined as $$T(i,j) = \begin{bmatrix} z & 0 \\ 0 & z \end{bmatrix}\begin{bmatrix} i \\ j \end{bmatrix} + \begin{bmatrix} d_x \\ d_y \end{bmatrix}$$

where z denote the zoom factor, and $d_x$ and $d_y$ denote the vertical and horizontal displacements.

The zoom factor z in this formula accounts for the camera zoom in and out and the object's motion with respect to the camera. When the camera zooms in and out to the object or the scene, factor z should increase and decrease, respectively. When the zoom factor z equals 1.0, then the motion of the object or the camera is only translational and the size of the object does not change. When the zoom factor z is less than or larger than 1.0, then the object gets smaller or bigger, respectively.

The robust mean square error is formulated as $$MSE = \frac{1}{N}\sum_{(i,j)} \frac{(M(i,j) - I(T(i,j))^2}{(M(i,j) - I(T(i,j)))^2 + \alpha^2}$$

where $\alpha$ is a constant value, which is preferably set to 10.

In order to find the best marker location, the location that gives the least mean square error MSE or the maximum correlation C value, in the current frame 250, logarithmic or exhaustive search strategies are applied in 3-D space, $(z, d_x, d_y)$ space.

In order to enhance the tracking performance, the object template is also divided into sub-templates and do the search for each sub-template separately. Then, from the motion models for those among the sub-templates that results in lower mean square error MSE or higher correlation C value compared to others are selected to fit a global motion model for the object.

Next, Step 170 is considered: Updating the confidence level of the tracking in the current frame. Depending on the value of the maximum correlation, or the minimum matching value, whichever is used during template matching, the confidence level of tracking is updated. If the correlation metric C is used for template matching, then the best correlation value is multiplied by 100 to obtain the confidence level of the tracking in the current frame 250. The confidence level of the tracking in the current frame is set to $100\times(1.0-MSE_{best})$, where $MSE_{best}$ is the minimum mean square error for the template matching.

Next, Step 180 is considered: Finding the location and shape of the object in the current frame and updating the template of the object in the current frame. Inside the computed marker of the object in the current frame 250, the backprojected image is convolved with a mask. A mask is selected in the shape of the object in reference frame whose template is used for matching. All the image values are ordered within the marker of the object in the convolved back-projected image. The ratios $\gamma_1$, and $\gamma_2$ of the region covered by the object are computed within its corresponding shape in the start and end frames, respectively. Using the following formula. A ratio $\hat{\gamma}$ for the current frame 250 is computed using the following formula:

$$\hat{\gamma} = \frac{t_2 - t}{t_2 - t_1}\gamma_1 + \frac{t - t_1}{t_2 - t_1}\gamma_2$$

Out of the pixels that correspond to the $\hat{\gamma}$ percent of the ordered image in the convolved back-projected image, a mask is constructed. A morphological opening and closing is applied to obtain the final mask for the object in the current frame 250. The boundary of this mask is then set to the boundary of the object 550 in the current frame 250.

Next, Step 190 is considered: Piecewise linear interpolation. Once the marker and locations of the object in a subset of frames in between the first and last frames are computed, piecewise linear interpolation is applied to obtain the marker and location of the object for every frame. The processed frames are ordered according to their time indices. The marker and location of the object in every frame in between any consecutive frames in the ordered processed frames are then estimated. Letting $t_1$ and $t_2$ denote the time indices for such consecutive frames, and t denote the time index for a frame in between them the same linear interpolation formulas described in Step 130 are utilized to find the location and marker of the object at time 1, from the location and marker of the object at instants $t_1$ and $t_2$.

The tool in accordance with the present invention provides a marker location for a selected object in every frame in between two selected frames of a video. Rather than tracking the object in every frame, the method in accordance with the invention tracks the object and the marker for a subset of frames in between the first and last frames. Then, using the marker locations in these frames, an interpolation is carried out of the marker locations in the other frames that are not processed.

In summary, the present invention provides a method for tracking a video object in an image sequence in between two time instances given the locations and shape of the object in those time instances. An object of the present method in accordance with the invention is to provide a real-time reliable approach to tracking objects in complex environments. The trajectory information extracted from the marker and location information in at least two or more frames that are already processed is used to predict the location and marker of the object in any frame between the selected time instances. In addition, the color information of the object in these selected time instances is used to obtain a second prediction for the marker and location of the object in any frame. The invention provides a method for fusing the two predictions for the marker and location of the object, which are based on the temporal trajectory of the object and the color histogram, to compute a search space to look for the object in the frame being processed. The method of object tracking applies a more general, yet simple, model for the motion of the marker than the translational motion model to account for camera zoom in and out. Further, this method intends to improve the object tracking performance by incorporating robust and order statistics concepts to template matching. Finally, the method for object tracking provides a way of finding the object boundary in every frame being processed by means of histogram back-projection to improve tracking performance by making use of the closer object template rather than the initial templates for tracking.

The invention is intended for implementation by computerized apparatus, preferably a programmable digital computer, as is per se well known in the art, with appropriate software, in conjunction with appropriate peripheral equipment as hereinabove described, for performing steps herein disclosed for practicing the present invention.

As will be understood, the invention has been described by way of non-limiting exemplary embodiments. Various modifications and additions will be apparent to those skilled in the art to which it pertains.

Such changes and modifications are contemplated to be within the spirit of the invention and the scope of the claims which follow.

What is claimed is:

1. A method for tracking a video object in a time-ordered sequence of image frames, comprising the steps of:
   (a) identifying an object to be tracked in said time-ordered sequence of frames;
   (b) selecting starting and ending frames for said object;
   (c) marking a boundary of said object in said starting and ending frames;
   (d) defining and determining a shape, a marker, and a location for said object;
   (e) computing a model histogram for said object from colors associated with said object within said boundary;
   (f) tracking said object's shape, marker and location in a subset of frames in between said starting and ending frames;
   (g) using linear interpolation to find a corresponding marker and location for said object for frames in between the starting and ending frames and in which said object is not tracked;
   wherein the step (f) comprises:
      selecting frames in which said object is to be tracked;
      selecting two reference frames for a frame being processed from frames already processed based on their distances in time to said frame being processed and their confidence to said frame being processed;
      making a first predication of the location and marker of said object and a confidence level of tracking in said frame being processed from those for said reference frames;
      selecting from templates for said reference frames a references template for pattern matching;
      identifying a second prediction of the location and marker of said object by back-projecting said model histogram into said current frame and fusing said two marker and frame predictions based on spatial relations to find a search space to look for said object in said frame being processed;
      identifying the marker of the object in the frame being processed by matching said reference template to colors in said frame being processed;
      updating the confidence level of the tracking in the frame being processed; and
      finding the shape and location of the object in the frame being processed using histogram back-projection.

2. A method for tracking a video object as recited in claim 1, where step (b) comprises:
   computing the index of a frame to be processed next based on the strategy: forward, backward, or bi-directional, and a current time step size;
   finding the two closest frames in time among the processed ones, which can be both in the same direction—forward or backward direction—or in different directions, whose confidence levels of tracking are above a predetermined threshold; and
   updating said time step size if bi-directional tracking strategy has been selected.

3. A method for tracking a video object in a time-ordered sequence of image frames, comprising the steps of:
   (a) identifying said object to be tracked in a first frame determining its shape in said first frame and obtaining a color histogram for said video object;
   (b) selecting another frame, referred to as the last frame and identifying the shape of the said object in said last frame;
   (c) identifying a predetermined location and marker for said object so as to determine its trajectory and global motion in frames between the first and last frames and forming respective templates and respective boundaries for said object as defined in said last and first frames;
   (d) finding said location, marker and shape for said object, in a subset of frames in between said first and last frames;
   (e) determining, in every frame, said location, marker and shape for said object from said location, marker and shape in said subset of frames using linear interpolation in time;

wherein step (d) comprises:
- (f) making a first prediction of marker and object location in a frame being processed from those for neighboring previously processed frames;
- (g) making a second prediction of marker and object location in said frame being processed based on histogram back-projection;
- (h) fusing said first and second predictions for marker and object location in said frame being processed to find a search space for template matching;
- (i) matching templates for finding marker and object location of said object in said frame being processed; and
- (j) identifying the boundary of said object in said frame being processed.

4. A method for tracking an object in a time-ordered sequence of image frames, comprising the steps of:

acquiring a boundary of said object in last and first frames of said sequence;

forming respective templates for said object as defined in said last and first frames;

computing a model color histogram from said respective templates;

selecting a current frame from said sequence for processing next;

selecting two reference frames;

determining whether said current frame is equal to one of said last and first frames and the current time step size;

if so, utilizing said object's location and shape marker in said current frame to make a first prediction of said object's location and shape in said two reference frames and to set a confidence level based on matching of said templates;

selecting from said reference frames a reference template for matching;

deriving a second prediction of location by histogram back-projection;

utilizing two location and shape predictions from said first and second predictions and said confidence level, set a search window;

applying matching between said templates so as to identify a shape marker for said object in said current frame;

updating said confidence level in said current frame based on results of said matching between said templates;

updating the location and shape in said current frame; and interpolating the current marker location of said object in any unprocessed frame in said sequence from the two marker locations in the two neighboring in time processed frames.

* * * * *